D. P. ELLIOTT.
MACHINE FOR CATCHING AND DESTROYING BOLL WEEVILS.
APPLICATION FILED JULY 7, 1917.
1,405,573.
Patented Feb. 7, 1922.
7 SHEETS—SHEET 2.
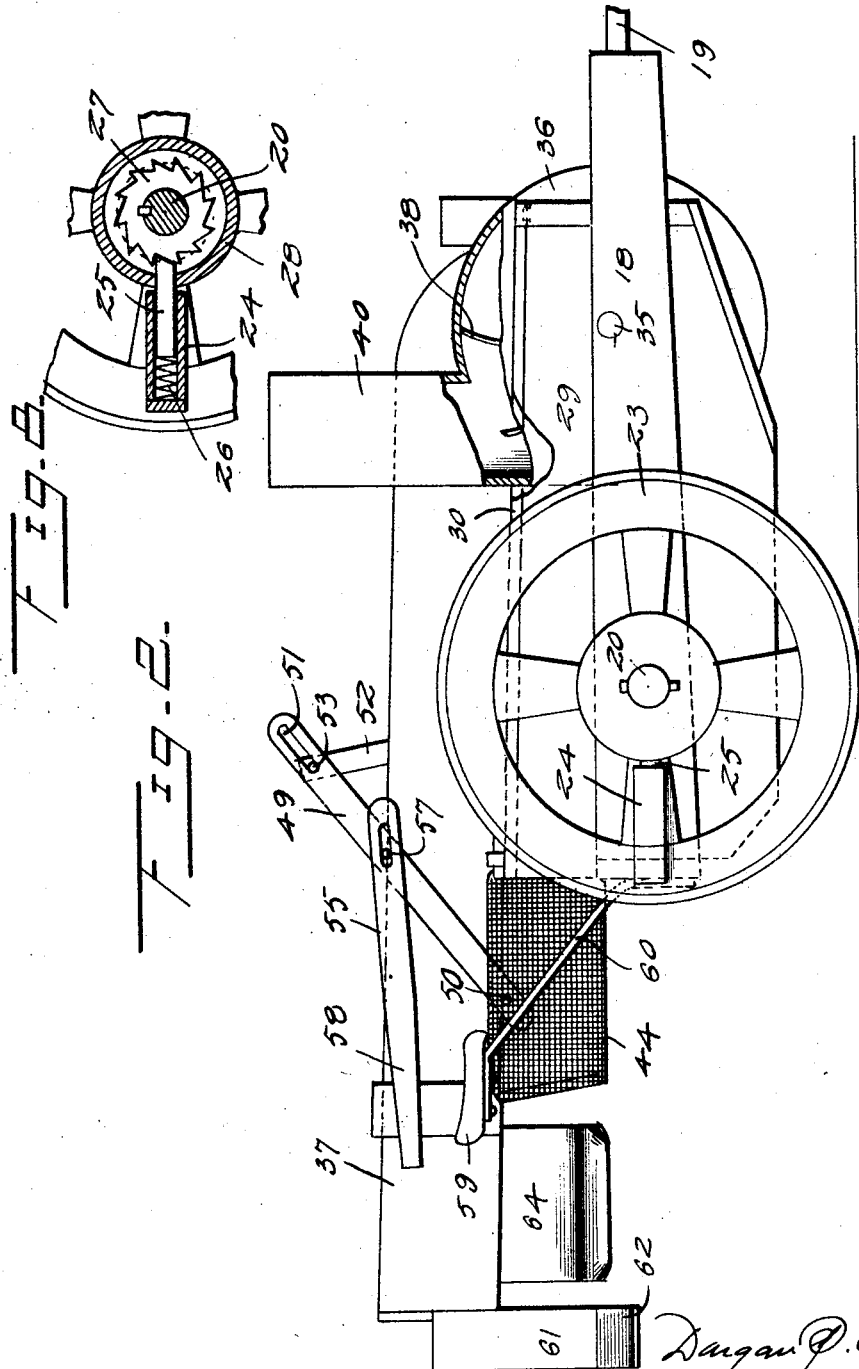

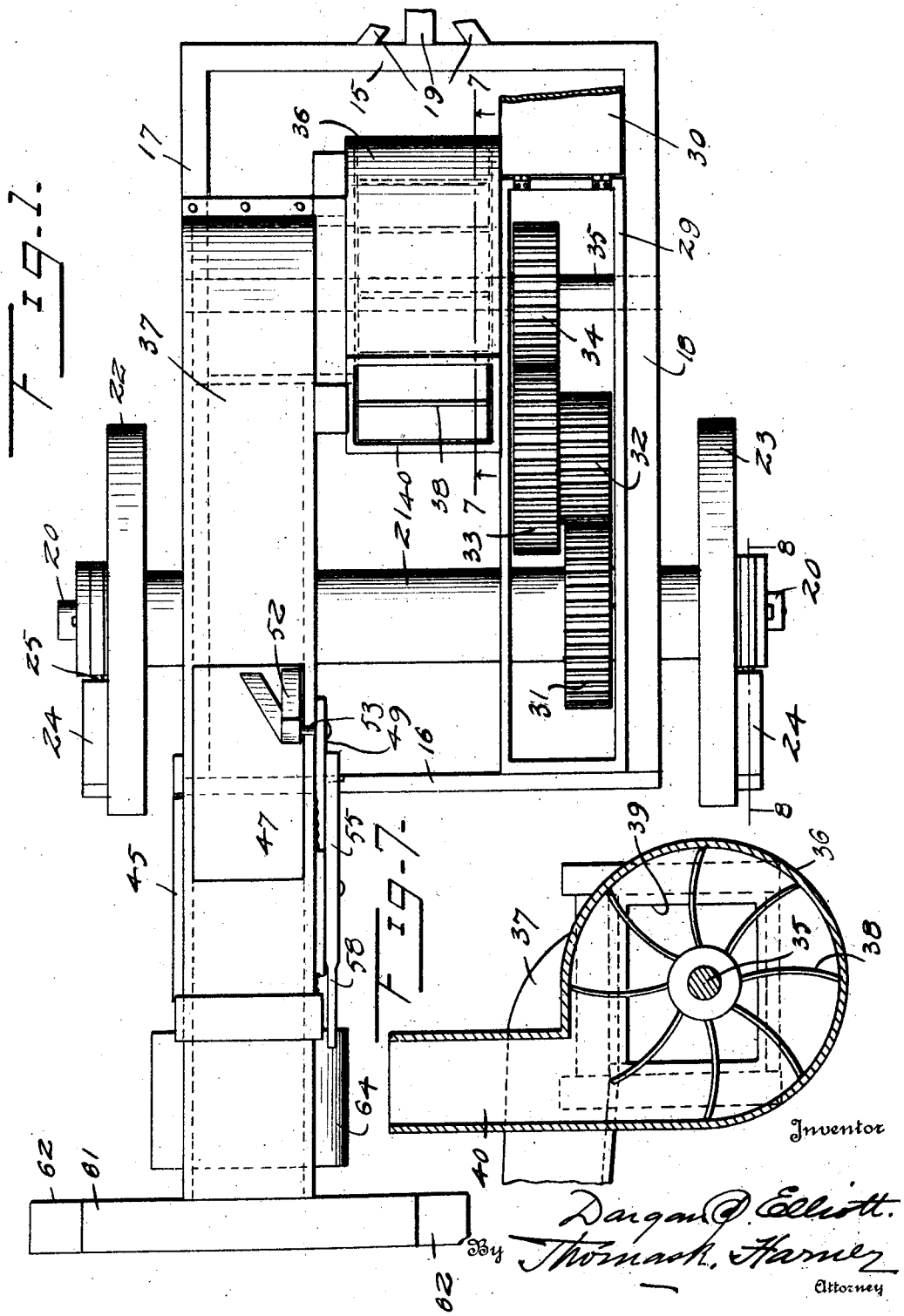

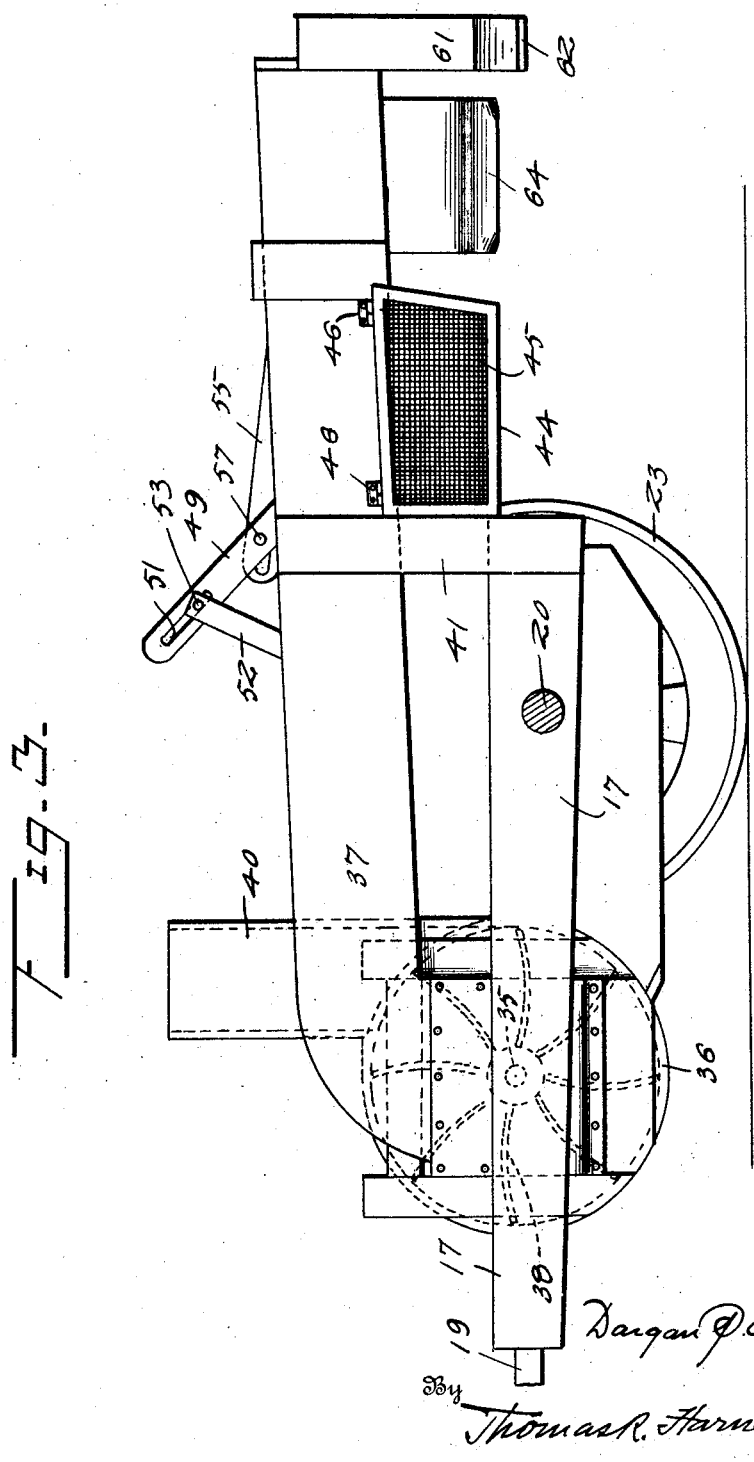

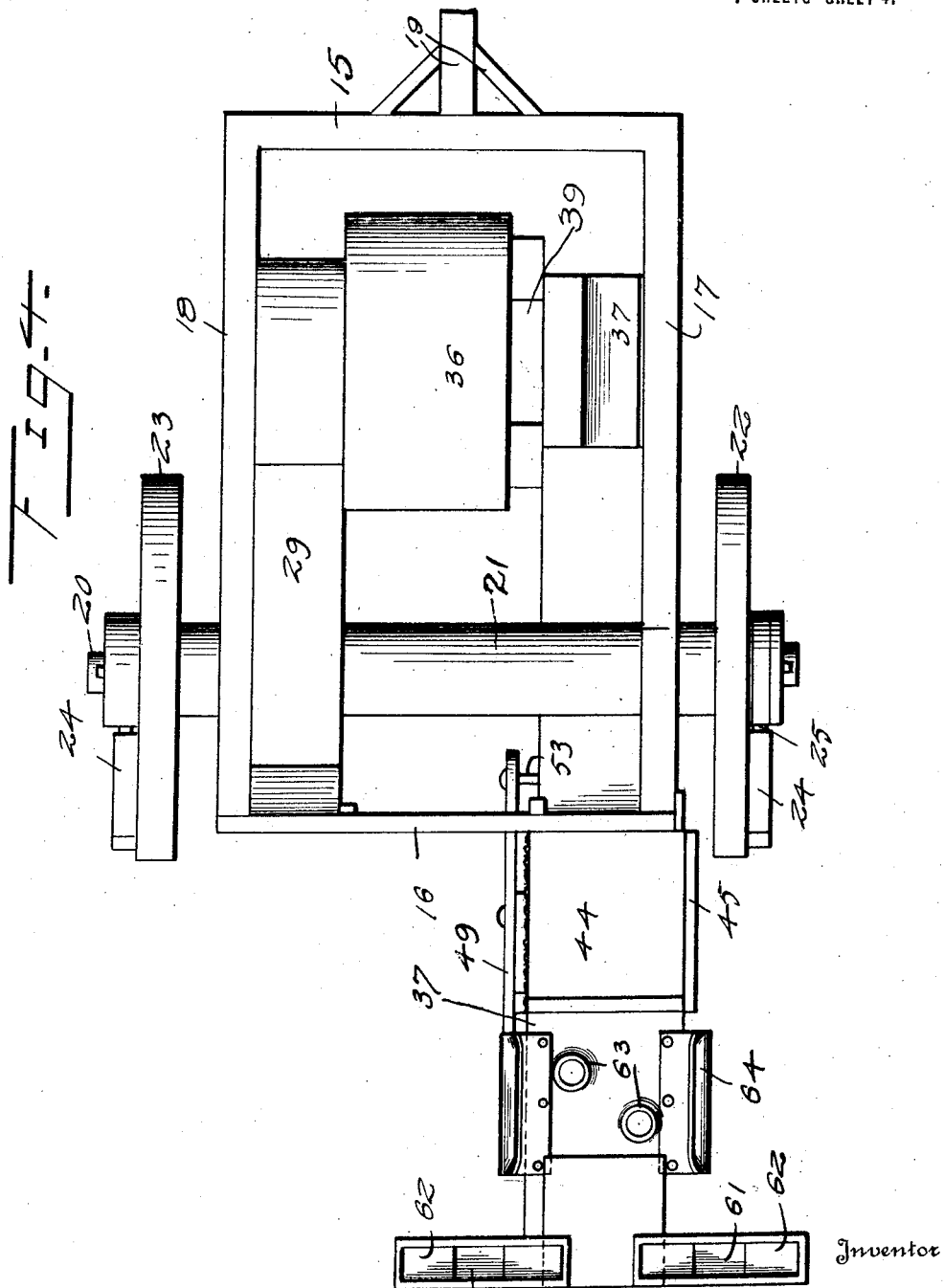

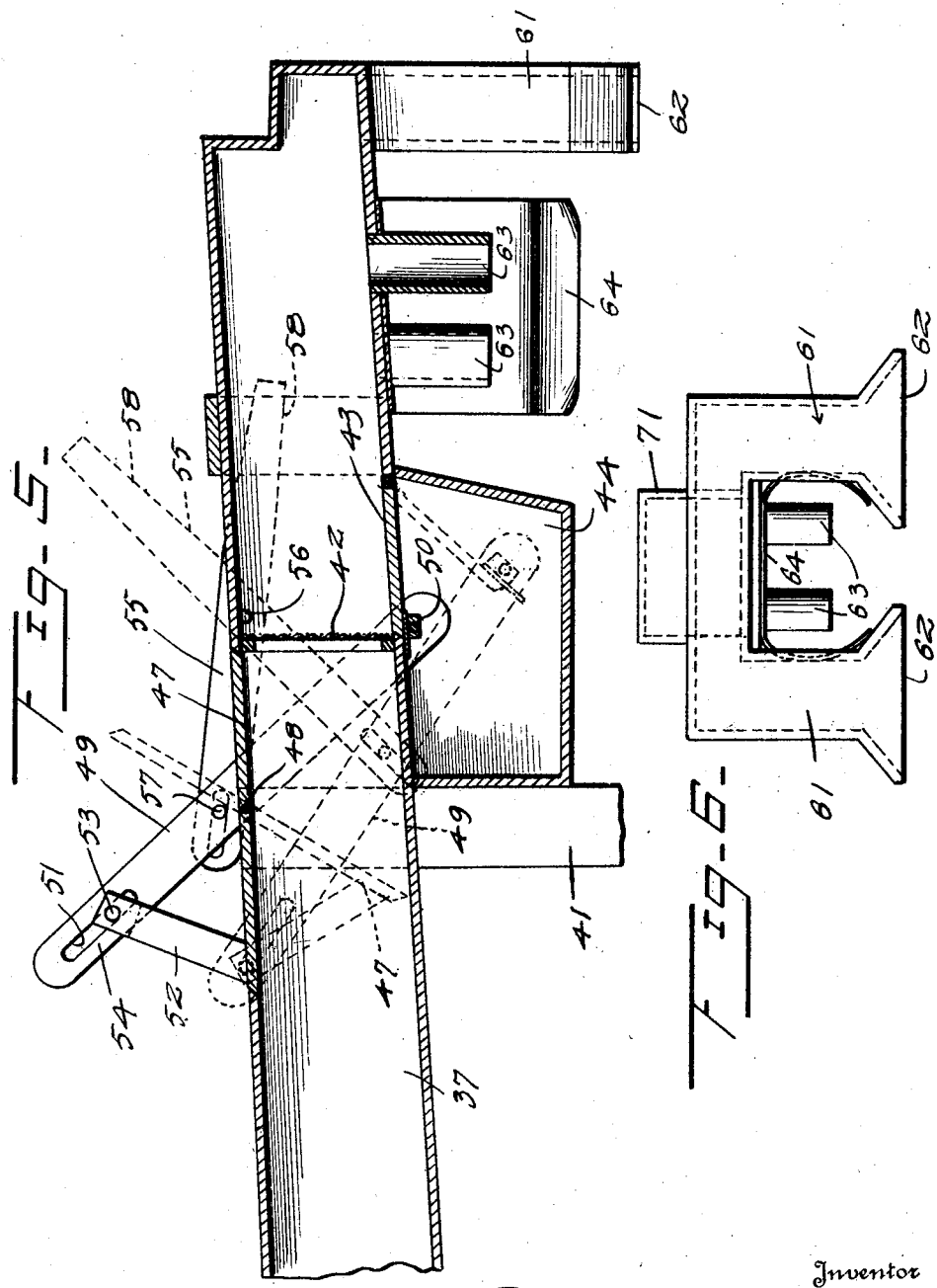

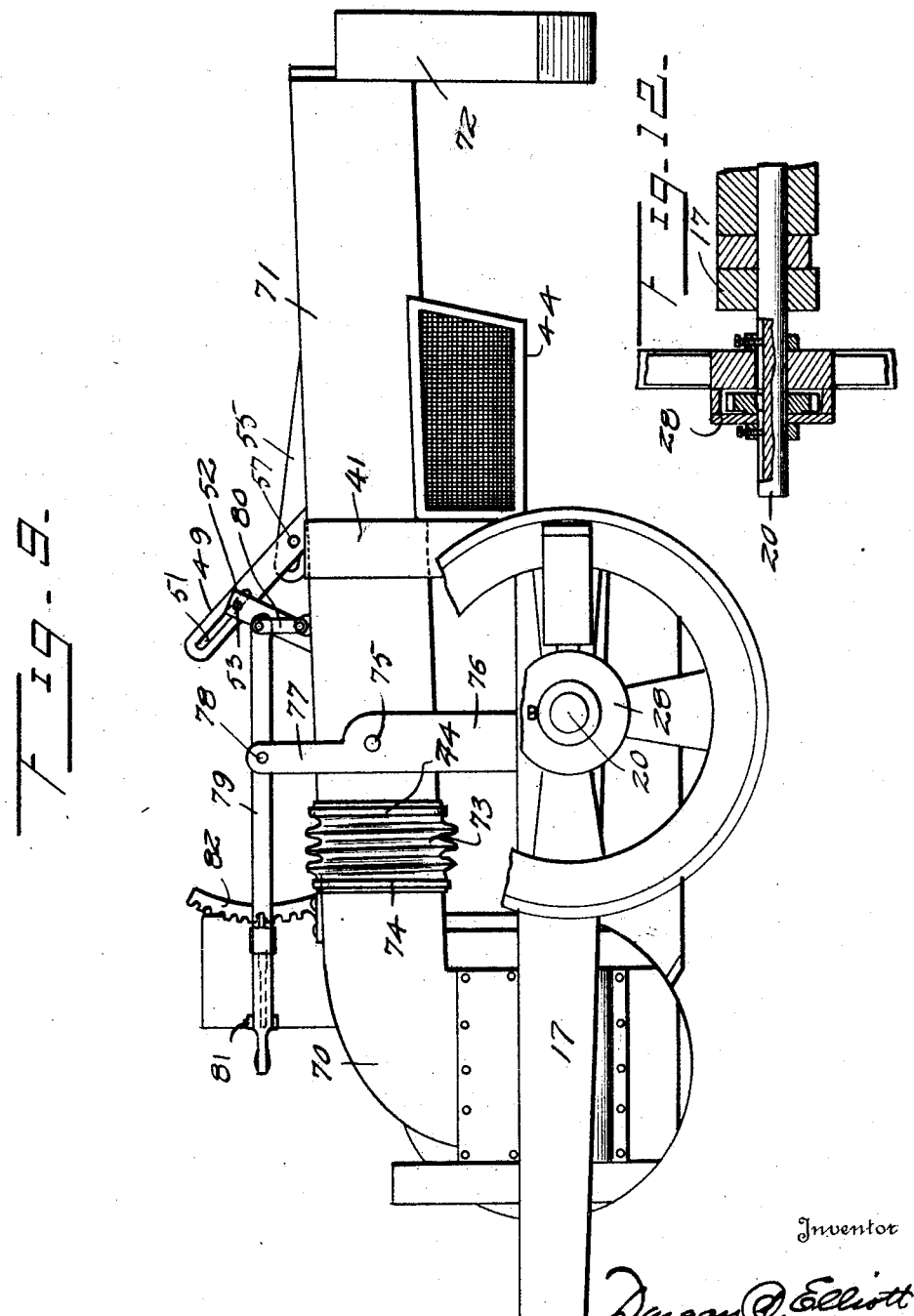

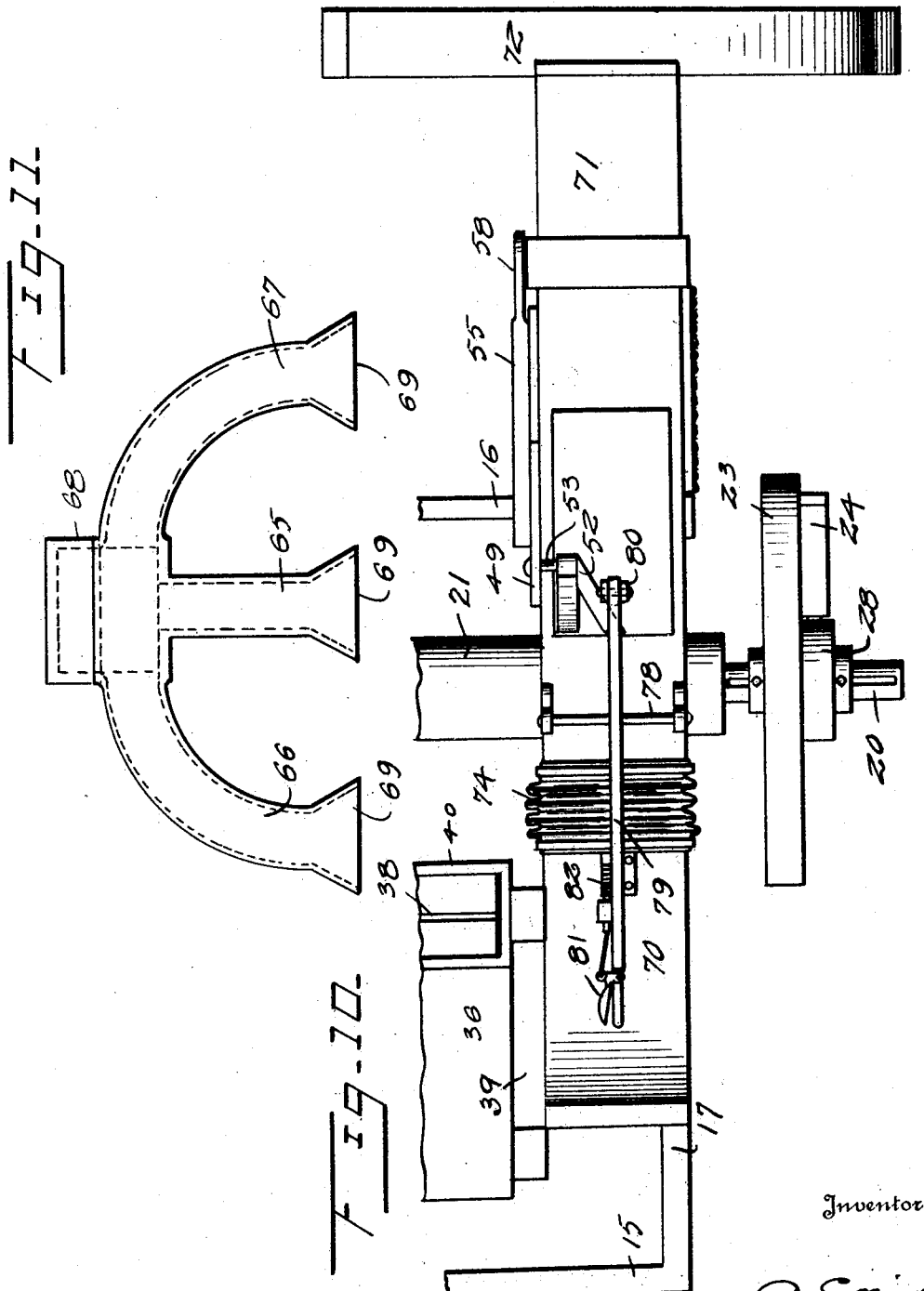

UNITED STATES PATENT OFFICE.

DARGAN P. ELLIOTT, OF RIMINI, SOUTH CAROLINA.

MACHINE FOR CATCHING AND DESTROYING BOLL WEEVILS.

1,405,573. Specification of Letters Patent. Patented Feb. 7, 1922.

Application filed July 7, 1921. Serial No. 482,927.

*To all whom it may concern:*

Be it known that I, DARGAN P. ELLIOTT, a citizen of the United States of America, residing at Rimini, in the county of Clarendon and State of South Carolina, have invented certain new and useful Improvements in Machines for Catching and Destroying Boll Weevils, of which the following is a specification.

My present invention relates generally to insect catchers and destroyers, and more particularly to machines for entrapping boll-weevils in cotton fields and the like, my object being to provide a wheeled machine of simple construction and maximum effectiveness which, operating under its own tractive power will entrap boll-weevils sucking them from the plants and from the ground, as well as parts of the cotton plants which through injury have fallen to the ground, in such manner as to admit of ready transferring of the insects and their destruction by burning or otherwise.

A further object is the provision of a readily adjustable suction device which will adapt itself to large and small plants and will enable the work to be carried on in a quick efficient manner and with minimum cost both in the first instance and in the upkeep.

It is a well known fact that the boll-weevil, which multiplies very rapidly, passes the winter in the adult stage i. e., as a beetle and in the spring and throughout the fruiting season of the cotton plant, deposits the eggs in cavities formed by eating into the fruit. The boll-weevil feeds on the squares of the plant and frequently falls to the ground with the injured squares. This is particularly true during the short period, usually four to six days between the emergence of the adult from the pupa stage and the time it commences further production. Moreover it has been noted and many times commented upon that the boll-weevil has an interesting habit of feigning death when disturbed, the insects contracting their limbs at this time and falling to the ground.

From the above it becomes readily apparent that in any means of boll-weevil control it becomes particularly important to influence the removal of boll-weevils and plant parts infested thereby, from the ground, during any action seeking to remove them from the squares of the plant.

My invention additionally aims to do this with little effort and great efficiency.

In consideration of the above, the further objects and advantages of my invention will be thoroughly understood and may be better appreciated by reference to the accompanying drawings, which form a part of this specification, and in which, Figure 1 is a top plan view with the gear box cover raised and broken away and with the seat and its support removed, Figure 2 is a side view, looking at the right hand side of the machine, Figure 3 is a side view looking at the left hand side with the rear traction wheel cut away, Figure 4 is a bottom plan view, Figure 5 is an enlarged longitudinal section through the suction or intake conduit, Figure 6 is a rear end view thereof, Figure 7 is a vertical longitudinal section through the fan casing, Figure 8 is a detail section through the ratchet drive arrangement of one of the wheels, Figure 9 is a side view of a slightly modified construction, Figure 10 is a partial top plan view thereof, Figure 11 is a front elevation of the suction head, and Figure 12 is a partial section taken along the wheel shaft.

Referring now to these figures the machine according to my invention includes a horizontal rectangular frame of which the front and rear bars appear respectively at 15 and 16 and the side bars at 17 and 18, the front bar 15 having any suitable draft attachments secured thereto and extending forwardly therefrom as partially seen at 19.

Through the rear portion of the side bars 17 and 18 is journaled a shaft 20, projecting also through a shaft boxing 21 having portions between and beyond the side bars, wheels 22 and 23 being rotatably mounted upon opposite ends of shaft 20 and each provided with a radially disposed housing 24 in which a ratchet pin 25 operates under control of a spring 26 the latter of which serves to shift the pin inwardly into engagement with a ratchet wheel 27 keyed or otherwise secured on the shaft 20 as particularly seen in Figure 8 and located within a laterally extended side portion 28 of the wheel hub.

Along the side bar 18 of the frame is secured a gear box 29, having a hinged cover 30 the latter of which when raised permits of ready access to the gears within the box. These gears include a gear 31 keyed or otherwise fastened upon the shaft 20 and engaging one gear 32 of a counter shaft whose other gear 33 meshes with a gear 34 upon a forward transverse shaft 35 the opposite ends of the latter of which are journaled in the frame side bars 17 and 18. This shaft 35 extends through the forward portion of the gear box 29 and also through a fan casing 36 secured within the frame between the gear box and the forward end of the suction conduit 37 the latter of which leads rearwardly along the opposite frame bar 17. The fan 38 in casing 36, which is secured on shaft 35, has a lateral air intake 39 in communication with the forward portion of the suction conduit 37 and has an upwardly extending peripheral outlet 40 and it thus becomes obvious that when the machine is drawn forwardly the rotation of the traction wheels 22 and 23 will be communicated through the ratchet mechanisms to the shaft 20 and from the latter through gears 31, 32, 33 and 34 to the fan shaft 35 so as to cause rotation of the fan 38 in order to create suction through the suction conduit 37, the blast of the fan leading outwardly through the fan outlet 40.

The rear portion of the conduit 37 projects above and rearwardly beyond the wheel frame, from whose rear portion it is supported by uprights 41 as seen in Figure 3, and in its portion rearwardly beyond the frame, this suction conduit has a transverse baffle screen 42 as shown in Figure 5 and a downwardly opening door 43 in its lower wall immediately in front of screen 42. This door opens downwardly into a cage 44 below and secured to the conduit 37, one side wall 45 of which is hinged to the conduit as at 46 to swing outwardly to open position permitting the insects and fragments of cotton plants to be discharged for burning or treatment in any other way so as to destroy the boll-weevil, both adult and young.

In its upper wall forwardly of the screen 42, the conduit has an intermediately fulcrumed swinging door 47 whose portion forwardly of its fulcrum 48 is adapted to be swung downwardly across the interior of the conduit in order to cut off communication from the fan 38 to the baffle screen. In this position of the door 47 the suction fan will draw air in through the door opening and when in this position it is obvious that as the door frees the baffle screen from the influence of the suction producing means, the door 43 may be swung downwardly and the insects will thus drop into the trap 44.

I preferably provide for simultaneous opening and closing movement of the doors 43 and 47, and to this end a connecting arm 49 is pivotally connected at its lower rear end by a pivot 50 to the free edge of the door 43. The upper lengthwise slotted end 51 of this connecting arm is pivotally connected to one end of a link 52 the opposite end of which is pivoted to the forward free edge of the door 47, the pivot between the link 52 and the arm 49 being in the nature of a pin 53 which extends through the slot 54 of the upper forward end of the said arm. A lecer 55 is intermediately fulcrumed at 56 and has its forward end provided with a lengthwise slot receiving a pivot pin 57 which extends through the connecting arm 49 intermediate the ends of the latter, the rear end of lever 55 being in the nature of a handle 58 by which it may be manipulated between the positions shown in full and dotted lines in Figure 5, and it is for this purpose the parts are so arranged as that this rear handle portion of the lever is disposed in both positions adjacent to the operator's seat 59 which may be supported as in Figure 2 upon a seat bar 60 whose lower forward end is securely fastened to the rear frame bar 16.

At the forward end of the conduit 37 is a suction head which may include laterally spaced vertical intake pipes 61, each having a lower flaring mouth 62. The suction head may also include laterally spaced downwardly opening tubes 63 within a transverse shield 64 whose upper central portion is secured to the lower surface of the conduit 37 and whose lower ends are spaced apart to extend upon the sides of the plane of a row of cotton plants, this shield confining for a moment at least, the insects within the influence of the suction tubes 63.

The suction pipes 61 with their lower flared ends 62 project downwardly a material distance beyond the lower end of the suction tubes 63 and it is therefore obvious that these latter suction pipes may depend into fairly close proximity to the surface of the ground in order to suck up the insects and particles of plants, for instance cotton squares with the insects thereon.

It is to be observed with reference to Figure 11 however that the suction head may take the form of a central suction pipe 65 and spaced side suction pipes 66 and 67, all depending from and connected in common to the suction conduit 68, and each provided with a flaring lower end 69. As shown in this figure the several suction pipes have their lower ends terminating in the same horizontal plane so that with a suction head of this type the machine may operate in three spaces between rows of plants.

It is also obvious I may provide for ready control and adjustment of the suction head with respect to the surface of the ground by constructing the suction conduit in two sections as shown in Figures 9 and 10, the front section being indicated at 70 and the rear section being indicated at 71 with a suction head 72 of either of the before described forms. In this case the rear section 71 of the conduit will carry the insect discharging features before described and will be joined at its forward end to the rear end of the forward section 70 by a flexible tube 73 clamped at its ends as at 74 to the conduit sections. The rear section 71 in this instance will not be connected to supporting uprights like the parts 41, although it may be guided thereby, but will be mounted on horizontal pivots 75 in connection with the frame uprights 76 whose upper extensions 77 support a cross bar 78 forming the fulcrum of an adjustable supporting lever 79. The rear end of this lever is connected by links 80 to the rear section 71 and the forward handle end of the lever has a latch mechanism 81 engaging a notched quadrant 82 rigidly connected to and upstanding from the forward section 70.

It is obvious from the foregoing that in its passage over the ground, the machine proposed by my invention will create suction within the suction conduit in the manner previously described so that the insects on the ground or otherwise within the effective range of the suction head, will be drawn into the rear end of the suction conduit. As the machine proceeds the operator will from time to time manipulate the lever 55 adjacent to his seat 59 so as to simultaneously rock the doors 43 and 47 to the open positions shown in dotted lines in Figure 5. This, as before stated, results in cutting off the suction through the screen 42, causing the insects at the rear of the screen to fall into the trap 44. But very little time is consumed in this operation, in fact the doors are almost immediately returned to their normal closed positions. As the trap 44 fills with insects the machine is stopped from time to time and the trap is opened by raising its side door 45 which is preferably a screened frame as shown particularly in Figure 3 so that the inside of the trap may be viewed. The insects are then either raked or otherwise removed into another receptacle for destruction at a distant point or dumped on the ground and there burned, and it becomes apparent from this description of the operation as well as the foregoing description of the construction of the machine that it is capable of effective efficient use in the interests of boll-weevil control, may be readily manipulated and adjusted without loss of time, and will be economical both as to first cost and upkeep.

I claim:

1. A suction insect remover including a suction conduit having a screen therein intermediate its ends and provided with a downwardly opening door adjacent to the screen and between the latter and the intake end of the conduit, a trap below the conduit into which the said door opens, a second door in the conduit on the outlet side of the screen, having a portion thereof movable across the conduit in the open position of the door, and a lever having connections for simultaneously moving the said doors as described.

2. A suction insect remover including suction producing means, a suction conduit having communication at one end with said suction means and having a suction head at its opposite end, a screen intermediate said ends of the conduit, a trap below the conduit adjacent to the intake side of the screen, and means for simultaneously cutting off communication between the screen and the suction means and placing the conduit in communication with the trap at the intake side of the screen.

3. A suction insect remover including suction producing means, a suction conduit having communication at one end with said suction means and having a suction head at its opposite end, a screen intermediate said ends of the conduit, a trap below the conduit adjacent to the intake side of the screen, normally closed doors in the conduit at opposite sides of the screen, one of which doors opens into the trap and the other of which opens to the atmosphere and has a hinge intermediate its ends and a portion at one side of the hinge adapted to extend across the conduit in the open position of the door, and manual means externally of the conduit for manually manipulating said doors.

4. A suction insect remover including suction producing means, a suction conduit having communication at one end with said suction means and having a suction head at its opposite end, a screen intermediate said ends of the conduit, a trap below the conduit adjacent to the intake side of the screen, normally closed doors in the conduit at opposite sides of the screen, one of which doors opens into the trap and the other of which opens to the atmosphere and has a portion extending across the conduit in the open position of the door, and manually actuated means for simultaneously opening and closing said doors.

5. A suction insect remover including suction producing means, a suction conduit having communication at one end with said suction means and having a suction head at its opposite end, a screen intermediate said ends of the conduit, a trap below the conduit adjacent to the intake side of the screen, normally closed doors in the conduit at opposite sides of the screen, one of which doors opens into the trap and the other of which opens to the atmosphere and has a portion extending across the conduit in the open position of the door, and manually actuated means for simultaneously opening and closing said doors, including a lever mounted externally of the conduit and an arm fulcrumed on the conduit having flexible connection with said lever and also having connections at its opposite ends with said doors.

6. A suction insect remover including suction producing means, a suction conduit having communication at one end with said suction means and having a suction head at its opposite end and an opening in its top intermediate its ends, a screen extending across the conduit adjacent to said opening and between the latter and the suction head, a trap below the conduit adjacent to the screen and between the latter and the suction head, doors controlling said opening and said trap, and connections for simultaneously actuating said doors.

In testimony whereof I have affixed my signature.

DARGAN P. ELLIOTT.